US 6,693,407 B2

(12) United States Patent
Atmur

(10) Patent No.: US 6,693,407 B2
(45) Date of Patent: Feb. 17, 2004

(54) CONTROLLER AND ASSOCIATED SYSTEM AND METHOD FOR PULSE-WIDTH-MODULATION SWITCHING NOISE REDUCTION BY VOLTAGE CONTROL

(75) Inventor: Robert J. Atmur, Whittier, CA (US)

(73) Assignee: The Boeing Company, Seattle, WA (US)

( * ) Notice: Subject to any disclaimer, the term of this patent is extended or adjusted under 35 U.S.C. 154(b) by 176 days.

(21) Appl. No.: 09/892,176

(22) Filed: Jun. 26, 2001

(65) Prior Publication Data
US 2003/0001538 A1 Jan. 2, 2003

(51) Int. Cl.[7] .............................. H02P 5/28; H02P 5/34; H02P 7/36
(52) U.S. Cl. ................. 318/811; 318/139; 318/254; 318/432; 318/434; 318/439; 318/800; 388/838; 388/907
(58) Field of Search ................. 318/254, 811, 318/138, 432, 434, 439, 800; 388/838, 907

(56) References Cited

U.S. PATENT DOCUMENTS

| 4,504,602 A | * | 3/1985 | O'Connell et al. ............ 521/78 |
| 4,550,281 A |   | 10/1985 | Hirata |
| 4,767,976 A | * | 8/1988 | Mutoh et al. ................ 318/808 |
| 4,788,485 A | * | 11/1988 | Kawagishi et al. .......... 318/811 |
| 4,855,652 A | * | 8/1989 | Yamashita et al. .......... 318/268 |
| 4,935,684 A |   | 6/1990 | Watanabe |
| 5,089,760 A |   | 2/1992 | Joyner, Jr. |
| 5,532,569 A | * | 7/1996 | Tanamachi et al. .......... 318/802 |
| 5,686,807 A | * | 11/1997 | Kusano et al. ............... 318/808 |
| 5,986,426 A |   | 11/1999 | Rowan |
| 6,049,474 A | * | 4/2000 | Platnic ......................... 363/98 |
| 6,211,635 B1 | * | 4/2001 | Kambe et al. ............... 318/254 |

FOREIGN PATENT DOCUMENTS

| EP | 0 695 024 A2 | 1/1996 |
| FR | 2 483 067 A | 4/1982 |
| JP | 0695024 A2 * | 6/1995 ........ H02M/5/458 |

* cited by examiner

Primary Examiner—Robert Nappi
Assistant Examiner—Tyrone Smith
(74) Attorney, Agent, or Firm—Alston & Bird LLP

(57) ABSTRACT

A system for controlling a brushless direct current (BLDC) motor includes a power supply having a controllably alterable voltage output, and a controller in electrical communication with the power supply and the motor. The controller receives the voltage output of the power supply and can provide a pulse-width-modulated input voltage to the motor. Additionally, the controller can measure an average input current to the motor and a speed of the motor and thereafter alter the voltage output of the power supply based upon the average input current to the motor and the speed of the motor. In a further embodiment, the system can include an acoustic coating disposed about an outer surface of the motor and the controller.

16 Claims, 3 Drawing Sheets

CONTROLLER AND ASSOCIATED SYSTEM AND METHOD FOR PULSE-WIDTH-MODULATION SWITCHING NOISE REDUCTION BY VOLTAGE CONTROL

FEDERALLY SPONSORED RESEARCH OR DEVELOPMENT

The United States Government may have rights in this invention as provided by the terms of Contract No. N00024-00-C-6103 awarded by the Department of the Navy.

FIELD OF THE INVENTION

The present invention relates generally to systems and methods for controlling an electric motor and, more particularly, to a controller and associated system and method for switching noise reduction of a pulse-width-modulated controlled brushless direct current (BLDC) motor.

BACKGROUND OF THE INVENTION

Electrical machines are used throughout a great number of devices today, and typically consist of motors, which convert electrical energy into mechanical energy, and generators, which convert mechanical energy into electrical energy. Generally, electrical machines fall into one of three categories: polyphase synchronous machines, polyphase asynchronous (i.e., induction) machines and direct current (DC) machines. Typical machines consist of two main portions: a stationary, outside portion called a stator, and a rotating, inner portion called a rotor. The rotor of typical machines is mounted on a stiff rod, or shaft, that is supported in bearings so that the rotor is free to turn within the stator to produce mechanical energy.

In one type of synchronous machine, a permanent magnet, brushless direct current (BLDC) machine, the stator is composed of windings that are connected to a controller, and the rotor is composed of two or more permanent magnets of opposed magnetic polarity. The controller generates polyphase alternating input currents to the stator windings. As the rotor rotates within the stator, and the magnets of one polarity approach cores that conduct the opposed polarity, sensors signal the angular position of the rotor to the controller which, in turn, controls the alternating currents to switch the polarity of the magnetic field produced by windings on the stator. For example, a three-phase BLDC motor can have two, four or more permanent magnets with alternating magnetic polarities mounted on its rotor. The required rotating magnetic field is produced by current through the stator windings. And the three phases of the current are switched in sequence, which is dictated by the angular position of the rotor.

In many BLDC motor systems, the speed of the BLDC motor is controlled by pulse modulating, such as pulse width modulating, the input voltage generated by the controller. By pulse-width-modulation (PWM) of the input voltage, the controller controls the average input currents to the windings by using "on" and "off" states. During the time the input currents through the windings are increasing, the voltage supply provides constant voltage to the controller at a level at least the as high as the motor voltage required for the desired speed of operation. Once the currents have reached the required levels for the desired speed of the motor, the duty cycle is changed to that required to maintain the currents at or near the required level of current.

While PWM can provide an acceptable method of controlling the speed of a BLDC motor, it has some drawbacks. Among the drawbacks, in addition to producing currents at the desired rotational frequency, modulating the voltages produces in the system an unwanted current ripple at the PWM switching frequency and at higher harmonics of that frequency. The ripple current is a superimposed current on the average input currents to the windings, generated as the system keeps the input currents centered about an average value. The ripple current disadvantageously manifests itself as electromagnetic interference (EMI) and causes vibration noise in the system in the form of mechanical motion (i.e., rotational and megneto-striction) within the motor.

The amount of ripple current, $I_{ripple}$, produced in the system generally depends upon the switching, fundamental frequency, $\omega$, the voltage across the motor inductance, $V_L$, and the amount of motor inductance, L, as shown in equation (1):

$$I_{ripple} = \frac{V_L}{L \times \omega} \quad (1)$$

As illustrated by equation (1), the ripple current can be reduced by increasing the fundamental frequency or the motor inductance. But these options are costly and have a large schedule impact to the system beyond the motor itself. Also, these options cannot generally be implemented in many current motor controllers as these current motor controllers are not typically manufactured in high drive frequency configurations. Another possible option to reducing the ripple current is to filter the EMI and, therefore, the noise out of the system at the frequencies where the controller produces the ripple current, which effectively increases the motor inductance. But because many motor systems are subjected to large currents and voltages, implementing filters in the system would require costly, robust filters with high current and voltage tolerances.

SUMMARY OF THE INVENTION

In light of the foregoing, the present invention provides an improved controller and associated system and method for controlling a brushless direct current (BLDC) motor. The system of the present invention operates with a pulse-width-modulation (PWM) controller to reduce ripple current by controlling the voltage provided to the controller from a voltage source. By controlling the voltage provided by the voltage source, the controller can limit the amount of voltage produced at the motor inductance, which limits the ripple current, which limits the EMI and, thus, the noise produced in the system. Advantageously, the system reduces the ripple current without adding large and costly filters, forcing expensive changes to the controller design, or impacting the schedule for delivery of these systems.

According to one embodiment, the system for controlling the BLDC motor includes a power supply having a controllably alterable voltage output, and a controller in electrical communication with the power supply and the motor. The controller receives the voltage output of the power supply and can provide a pulse-width-modulated input voltage to the motor. Additionally, the controller can measure an average input current to the motor and a speed of the motor and, thereafter, alter the voltage output of the power supply based upon the average input current to the motor and the speed of the motor. In a further embodiment, the system can include an acoustic coating disposed about an outer surface of the motor and the controller.

In another embodiment, the controller includes a drive element and a processing element, with each in electrical communication with the power supply and the BLDC motor. In this embodiment, the drive element receives the input voltage from the power supply. The drive element is capable of providing the pulse-width-modulated input voltage to the motor and measuring the average input current to the motor and the speed of the motor. The processing element is capable altering the voltage output from the power supply based upon the average input current to the motor and the speed of the motor as measured by the drive element. Also, the controller can include a power-factor corrected converter, electrically connected between the power supply and a prime electrical power source that provides power to the power supply. By including the power-factor corrected converter, the efficiency of the power drawn from the prime power source is maximized, while conducted emissions from the system is minimized.

In operation, a controllably alterable voltage is supplied from the power supply to the controller. The controller, in turn, supplies a pulse-width-modulated input voltage to the BLDC motor. As the input voltage is supplied to the motor, the controller measures an average input current to the motor and a speed of the motor. Based upon the average input current to the motor and the speed of the motor, the controller then alters the input voltage from the power supply. For example, the controller can alter the input voltage so that a voltage applied to the motor equals an overhead voltage plus an offset voltage. The overhead voltage depends upon at least one characteristic of the motor, such as a predetermined speed of the motor and/or a predetermined start-up torque of the motor; and the offset voltage depends upon the rates of change of the average input current to the motor and the speed of the motor. In one embodiment, the overhead voltage plus the offset voltage is not more than 40 volts above a terminal voltage across the motor.

BRIEF DESCRIPTION OF THE DRAWINGS

Figure 1:
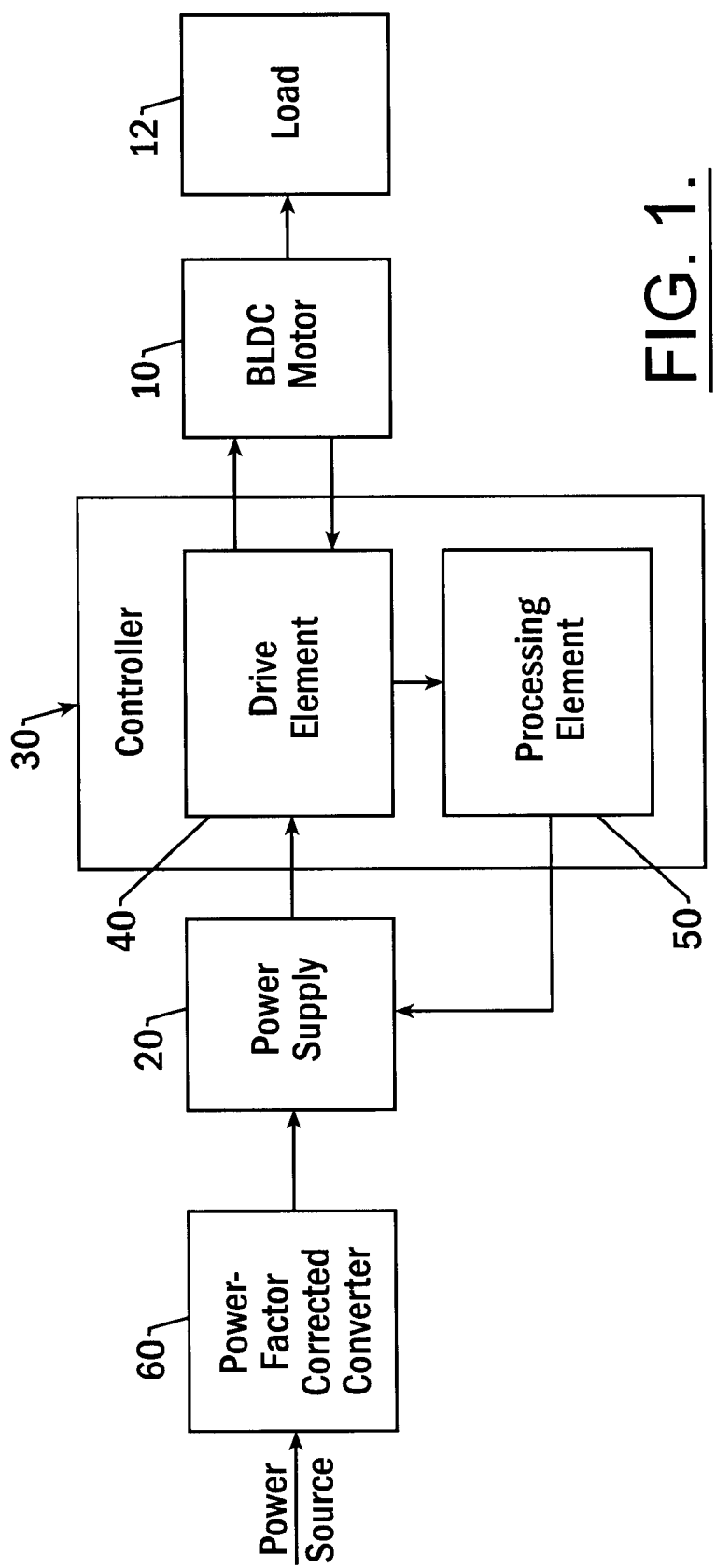
Figure 2:
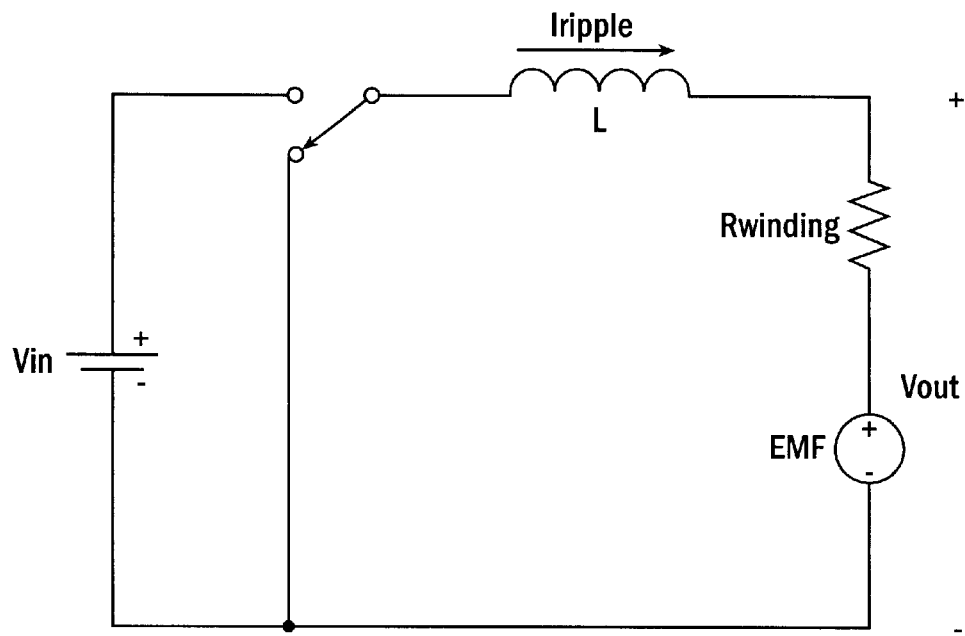
Figure 3:
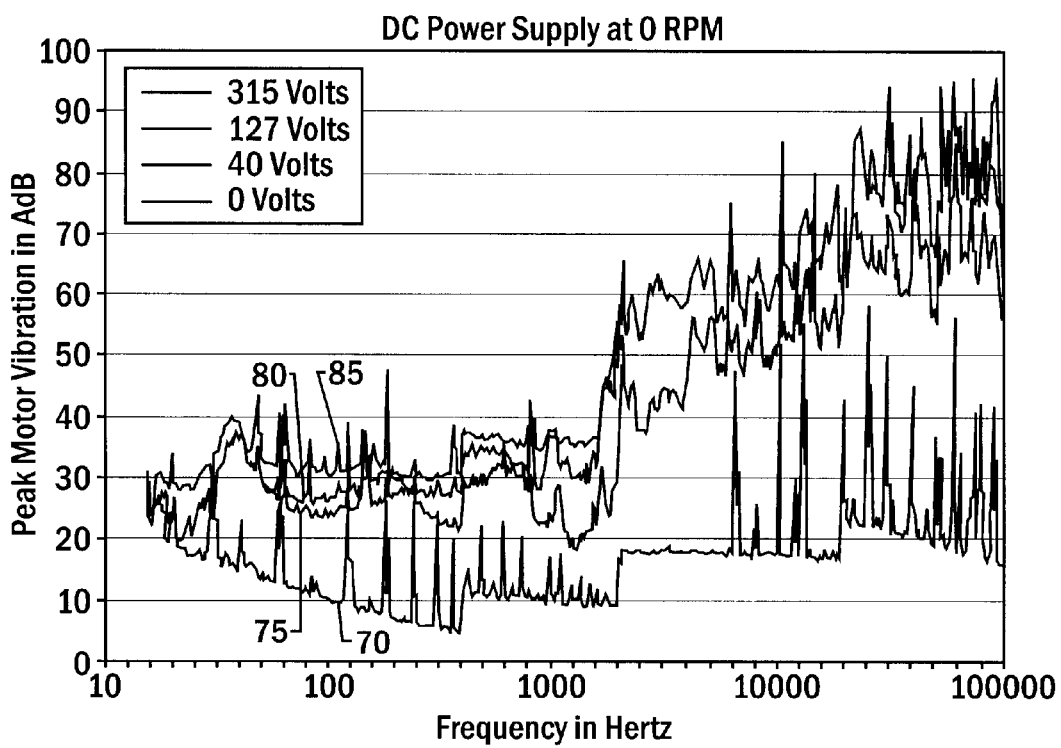
Figure 4:
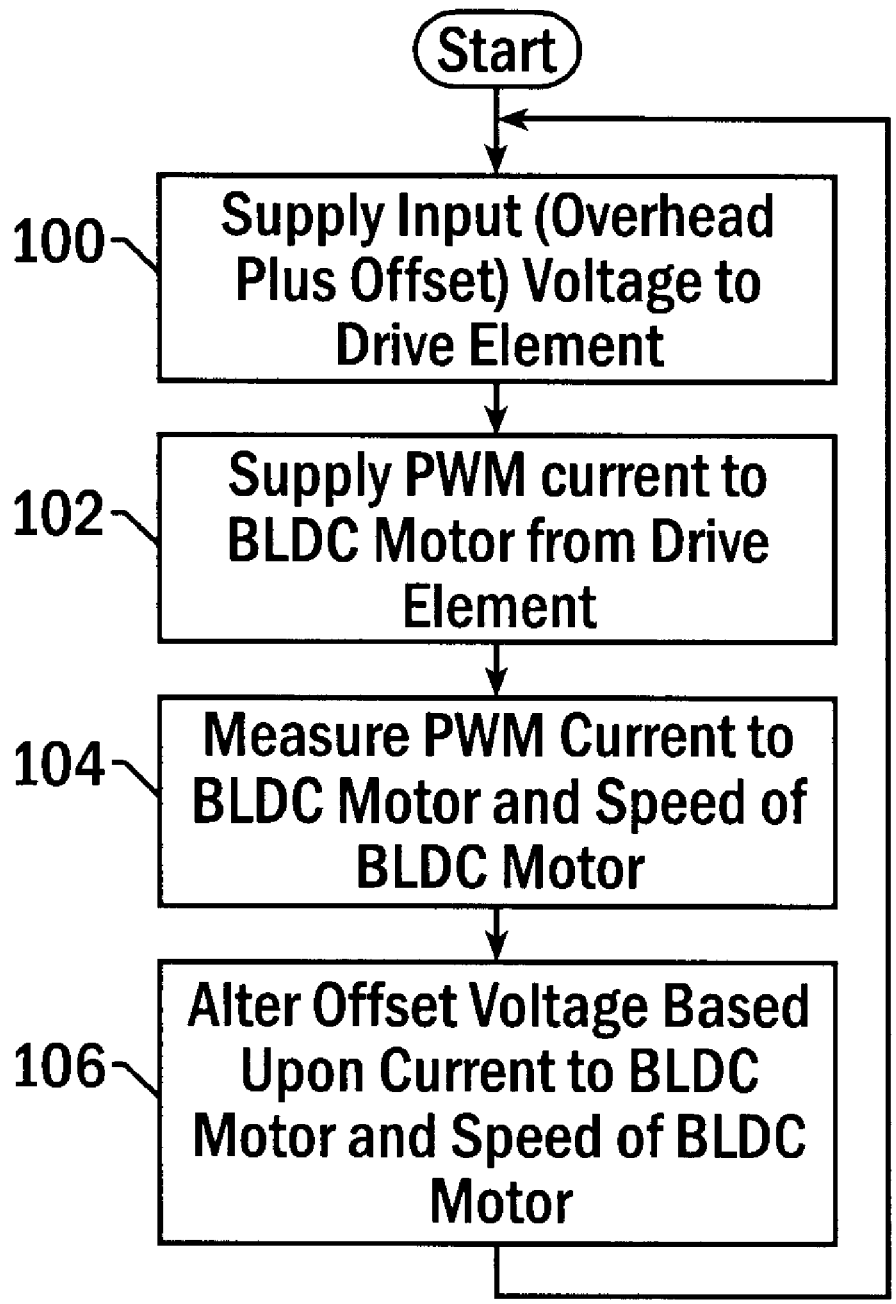

Having thus described the invention in general terms, reference will now be made to the accompanying drawings, which are not necessarily drawn to scale, and wherein:

FIG. 1 is a block diagram of a system for controlling a brushless direct current (BLDC) motor according to one embodiment of the present invention;

FIG. 2 is a schematic circuit diagram of a conventional modeled BLDC motor;

FIG. 3 is a graph comparing the peak BLDC motor vibration noise at different frequencies for two different input voltages to the motor; and FIG. 4 is a flow diagram illustrating a method for controlling the BLDC motor according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system for controlling a BLDC motor 10, according to one embodiment, includes a power supply 20 and a controller 30. Although not necessary for the practice of the present invention, the system can also include an acoustic coating disposed about an outer surface of the motor and the controller to reduce mechanical noise in the system, as such is known. The power supply has a controllably alterable voltage output and is typically a direct current (DC) power supply. But it should be understood that the voltage supply can alternatively be an alternating current (AC) power supply with an additional voltage converter included within the system, as described below. To provide the controllably alterable voltage output, the power supply can be a variable voltage DC or AC power supply, as such are known to those skilled in the art. But in a preferred embodiment the power supply is a remotely controllable voltage DC or AC power supply, that provides a controllably alterable voltage output at a specified frequency, such as any number of power supplies from TDI—Transistor Devices Inc. of Cedar Knolls, N.J., or the Sorensen division of the Elgar Corporation of San Diego, Calif.

The controller 30 is in electrical communication with the power supply 20 and the BLDC motor 10, and includes a drive element 40 and a processing element 50. In a preferred embodiment, the drive element is a BLDC pulse-width-modulation (PWM) amplifier, such as the 509 model PWM amplifier manufactured by Pacific Scientific of Rockford, Ill., in electrical communication with the power supply and the motor. The drive element receives the voltage output from the power supply and provides a PWM input voltage to the motor in accordance with a predetermined relationship between the average current output and the PWM input voltage, as such is known. To provide proper PWM input to the motor, the drive element typically receives commutation feedback from the motor consisting of rotor magnetic field orientation information obtained from such devices as magnetic field sensors (e.g., Hall Effect Sensors) or position sensors (e.g., encoders or resolvers). Also, the drive element measures the average input current provided to the motor and the speed of the motor, such as via a single speed absolute resolver.

The processing element 50 of the controller 30, such as a personal computer or other high level processor, is in electrical communication with the drive element 40 and the power supply 20. The processing element performs conventional motion control system controller functions, as such are known, including motor interfacing. In addition, the processing element controls the voltage output of the power supply, typically based upon the average input current to the BLDC motor 10 from the drive element and the speed of the motor as measured by the drive element, as described below.

To maximize the real power drawn from the power supply 20, the system can, but need not, include a power-factor corrected converter 60 electrically connected between the power supply and a prime electrical power source (not shown). The power-factor corrected converter can be a stand-alone device or included within the power supply. The power-factor corrected converter reduces harmonic content and/or aligns the phase angle of the motor current as reflected through the PWM voltage so it is in phase with the output voltage of the prime power supply. In addition, as used in embodiments employing an AC power supply, power-factor corrected converters can additionally reduce the harmonic content and/or align the converted AC voltage for use by the drive element.

As illustrated in FIG. 1, the BLDC motor 10 is preferably connected to a load 12, to which the mechanical energy generated by the motor is transferred. But if the motor is not connected to the load, the motor can act as a generator to produce electrical energy as the rotor freely spins. The faster the rotor spins, the more electrical energy that the motor can generate. This electrical energy increases the voltage drop across the motor inductance and, therefore, increases the ripple current, which increases the EMI and, thus, the noise. In this regard, to dissipate the electrical energy otherwise generated by the motor, the motor is preferably connected to a load that is frictionally dissipating in nature to an extent that the motor does not generate any voltage above the controller input.

Referring now to FIG. 2, the operation of the BLDC motor 10 can generally be modeled by a schematic circuit diagram including the input voltage to the motor, $V_{in}$, a motor inductance, L, a resistance of the stator windings of the motor, $R_{winding}$, and a terminal voltage drop across the motor, $V_{out}$. Taking the closed loop voltage across the modeled BLDC motor 10 illustrated in FIG. 2, the voltage drop across the motor inductance, $V_L$, can be represented as a function of the input voltage and the terminal voltage as follows:

$$V_L = V_{in} - V_{out} \tag{2}$$

Using equations (1) and (2), the motor inductance and the PWM frequency, ω, the ripple current, $I_{ripple}$, generally represented as the current through the motor inductance, is as follows:

$$I_{ripple} = \frac{V_{in} - V_{out}}{L \times \omega} \tag{3}$$

As illustrated by equation (3), the ripple current can be reduced by altering the input voltage so that the input voltage approaches the terminal voltage across the motor. From equation (3), if the input voltage were reduced from $V_{in1}$ to $V_{in2}$, the ratio drop in ripple current between $I_{ripple2}$ and $I_{ripple1}$ could be expressed as follows:

$$\frac{I_{ripple2}}{I_{ripple1}} = \frac{V_{in2} - V_{out}}{V_{in1} - V_{out}} \tag{4}$$

FIG. 3 illustrates the effect lowering the input voltage to a BLDC motor has on the EMI and, thus, the vibration noise caused by the ripple current produced in the motor running at a speed of 1800 revolutions per minute. The graph compares the noise vibration of the motor with a peak voltage of 315 volts (curve 85), and with reduced voltages of 127 volts (curve 80), 40 volts (curve 75) and without any input voltage to calibrate the background energy component (curve 70). As illustrated, the level of motor vibration decreases substantially as the input voltage is reduced from the peak voltage of 315 volts down to an input voltage of zero volts.

Also as illustrated from the modeled BLDC motor 10 of FIG. 2, the terminal voltage of the motor, $V_{out}$, depends upon the voltage drop across the stator windings. But as the rotor rotates within the stator, a back electromotive force (EMF) builds in the motor and causes an additional voltage drop that depends upon a characteristic voltage constant of the motor and the speed of the motor. Therefore, the total terminal voltage drop across the motor varies and can generally be expressed by equation (5) as follows:

$$V_{out} = I \times R_{winding} + K_e \times S_m \tag{5}$$

In equation (5), the EMF is expressed as the product of the voltage constant specific to the motor, $K_e$, and the speed of the motor, $S_m$, and the average input current to the motor is represented by I. Because the terminal voltage across the motor varies with the average current through the stator windings and the speed of the motor, in order to alter the input voltage to the motor so that it approaches the terminal voltage, within limits described below, the input voltage to the motor must be alterable depending upon the average current through the stator windings and the speed of the motor. Thus, the terminal voltage and the input voltage should rise and fall together, with the input voltage tracking the terminal voltage and separated by a predetermined or specified voltage, $V_{spec.}$, which represents a specified allowable voltage drop across the motor inductance, $V_L$.

With reference to FIG. 4, in operation, the controllably alterable voltage output from the power supply 20 is input into the drive element 40 of the controller 30 (block 100). In embodiments including the power-factor corrected converter 60, the drive element outputs a PWM voltage to the BLDC motor 10 based upon the voltage input into the drive element (block 102). As the drive element supplies the PWM voltage, the drive element measures an average current output to the BLDC motor and a speed of the rotor of the BLDC motor, and sends this information to the processing element 50 of the controller (block 104). The processing element, in turn, calculates the terminal voltage across the motor and transmits commands to the power supply to alter the voltage output from the power supply to keep the voltage output from the power supply a specified level, preferably no more than 40 volts, above the terminal voltage of the motor, as described below (block 106). Once the output voltage from the power supply is such that it is the specified level above the terminal voltage, the controller commands the power supply in a steady state until the load 12 connected to the motor alters the speed of the motor and/or the torque of the motor (which will alter the average current through the stator windings). As the load alters the speed and/or torque of the motor, the controller acts accordingly to alter the voltage output from the power supply.

Controlling a fixed voltage, $V_{spec}$, above that which is required by the motor speed and torque provides the system wit a predetermined rate of response to the dynamics of the load connected to the system. During operation, a fluctuation in the load requires the controller to adjust the average current in the windings. Therefore, the fixed voltage, $V_{spec}$, is selected based upon a desired dynamic response of the system in response to changes in the load. For example, $V_{spec}$ can be selected based upon a desired rate at which the average input current to the motor changes which, like the voltage drop across the motor inductance, can be expressed as a function of the inductance of the windings and the change in the average current across the windings, as illustrated by equation (6):

$$V_{spec.} = L \times \frac{dI}{dt} \tag{6}$$

In this regard, the controller can account for the switching time it takes the power supply to react to a change in the motor speed and/or motor average current. By maintaining the input voltage at a sufficiently elevated level, the input voltage will continue to exceed the terminal voltage, $V_{out}$, by at least the specified voltage, $V_{spec.}$, during the switching time required for the power supply to react to a change in motor speed and/or motor average current caused by a change in the load 12 connected to the motor.

To keep the voltage output from the power supply 20 at the specified level, $V_{spec.}$, above the terminal voltage, $V_{out}$, across the BLDC motor 10, the processing element 50 of the controller 30 sends commands to the power supply to alter the voltage output from the power supply to equal an overhead voltage plus an offset voltage. The overhead voltage, $V_{overhead}$, is a constant that represents the terminal voltage across the motor required to operate the motor at a predefined speed and can be represented by the following equation (7):

$$V_{overhead} = K_e \times S_{mp} \quad (7)$$

In equation (7), $S_{mp}$ represents the predefined speed of the motor, and $K_e$ represents the voltage constant specific to the motor. The offset voltage, $V_{offset}$, depends upon the average current to the motor and the speed of the motor, and varies as the average current to and/or the speed of the motor vary in response to changes in the load 12 connected to the motor. Utilizing equations (5), (6) and (7), the offset voltage can be expressed in the following equation (8):

$$V_{offset} = dI \times R_{winding} + K_e \times dS_m + \frac{dI}{dt} \times L \quad (8)$$

By controlling the power supply 20 to output a voltage equal to the overhead voltage plus an offset voltage, the processing element 50 of the controller 30 can cause the voltage input into the drive element 40 to track the terminal voltage across the BLDC motor 10 while remaining a specified level, $V_{spec}$, above the terminal voltage, as shown the following equation (9):

$$V_{overhead} + V_{offset} - V_{out} = V_{spec} \quad (9)$$

As illustrated by equation (9), to keep the terminal voltage, $V_{out}$, at a specified level, $V_{spec}$, above the voltage output from the power supply, as the terminal voltage increases or decreases with the input average current to the motor and/or the speed of the motor, per equation (5), the offset voltage must correspondingly increase or decrease. In this regard, the controller should control the power supply such that the voltage output by the power supply ($V_{overhead}+V_{offset}$) equals the sum of the terminal voltage, $V_{out}$, and the specified voltage level, $V_{spec}$, as set forth below in equation (10):

$$V_{overhead} + V_{offset} = V_{spec} + V_{out} \quad (10)$$

Based on equation (5), equation (10) can be rewritten as follows in equation (11):

$$V_{overhead} + V_{offset} = V_{spec} + I \times R_{winding} + K_e \times S_m \quad (11)$$

Since the specified voltage, $V_{spec}$, is a constant, such as 40 volts, the controller can determine the desired voltage output by the power supply by measuring the average current through the stator windings and the speed of the motor. The controller then provides feedback signals to the power supply instructing the power supply to produce the desired voltage output. Since the overhead voltage, $V_{overhead}$, is a constant per equation (7), the changes in the voltage output by the power supply are attributable to changes in the offset voltage, $V_{offset}$.

As an example, consider a BLDC motor that has a terminal voltage drop of 150 volts when it operates at a specified speed and torque of the maximum allowable for the motor. A conventional fixed power supply might output a voltage into the drive element as high as 320 volts. Therefore, the voltage across the motor inductance would equal 170 volts and, therefore, produce a large ripple current. But using equation (4), if the controller of the present invention tracked the voltage output from the power supply to limit the voltage across the motor inductance to a specified level of 40 volts above the 150 volt terminal voltage, the system could reduce the ripple current 23.6% or 12.6 dB.

Therefore, the system, controller and method of the present invention reduce the ripple current by controlling the voltage provided to the controller from a power supply. In contrast to other methods to reduce the ripple current, the system of the present invention reduces the EMI and, thus, the ripple current and vibration noise caused thereby, by employing a power supply with a controllably alterable output voltage to reduce the voltage drop across the motor inductance. The present invention also reduces the ripple current without making costly and large schedule changes to the system, and operates without additional costly and robust filters to filter out the high frequency noise. Also, while the system utilizes the speed of the motor to determine many of the parameters used to control the voltage provided to the controller, it should be understood that the torque of the motor could be used to determine the same parameters without departing from the spirit and scope of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for controlling a brushless direct current (BLDC) motor comprising:

a power supply having a controllably alterable voltage output; and a controller in electrical communication with said power supply and the BLDC motor, wherein said controller receives the voltage output of said power supply, and wherein said controller is capable of providing a pulse-width-modulated input voltage to the BLDC motor, wherein said controller is capable of measuring an average input current to the BLDC and a speed of the BLDC motor and thereafter altering the voltage output of said power supply based upon the average input current to the BLDC motor and the speed of the BLDC motor.

2. A system according to claim 1, wherein said controller comprises:

a drive element in electrical communication with said power supply and the BLDC motor, wherein said drive element receives the voltage output of said power supply, wherein said drive element is capable of providing the pulse-width-modulated input voltage to the BLDC motor, and wherein said drive element is capable of measuring the average input current to the BLDC motor and the speed of the BLDC motor; and a processing element in electrical communication with said power supply and said drive element, wherein said processing element is capable altering the voltage output from the power supply based upon the average input current to the BLDC motor and the speed of the BLDC motor as measured by said drive element.

3. A system according to claim 2 further comprising a power-factor corrected converter electrically connected between said power supply and a prime electrical supply capable of providing power to said power supply.

4. A system according to claim 1, wherein said controller alters the voltage output of said power supply such that a voltage applied to the BLDC motor equals an overhead voltage plus an offset voltage, wherein the overhead voltage depends upon at least one characteristic of the BLDC motor, and wherein the offset voltage depends upon the average input current to the BLDC motor and the speed of the BLDC motor.

5. A system according to claim 4, wherein the at least one characteristic of the BLDC motor comprises at least one of a predetermined speed of the BLDC motor and a predetermined torque of the BLDC motor.

6. A system according to claim 4, wherein the overhead voltage plus the offset voltage is not more than 40 volts above a terminal voltage across the motor.

7. A system according to claim 1 further comprising an acoustic coating disposed about an outer surface of the BLDC motor and said controller.

8. A method for controlling a brushless direct current (BLDC) motor comprising:

supplying a controllably alterable input voltage to a controller;

supplying a pulse-width-modulated input voltage to the BLDC motor from the controller based upon the input voltage to the controller;

measuring an average input current to the BLDC and a speed of the BLDC motor; and altering the input voltage to the controller based upon the average input current to the BLDC motor and the speed of the BLDC motor.

9. A method according to claim 8, wherein altering the input voltage to the controller comprises altering the input voltage such that a voltage applied to the BLDC motor equals an overhead voltage plus an offset voltage, wherein the overhead voltage depends upon at least one characteristic of the BLDC motor, and wherein the offset voltage depends upon the average input current to the BLDC motor and the speed of the BLDC motor.

10. A method according to claim 9, wherein the at least one characteristic of the BLDC motor comprises at least one of a predetermined speed of the BLDC motor and a predetermined torque of the BLDC motor.

11. A method according to claim 9, wherein the overhead voltage plus the offset voltage is not more than 40 volts above a terminal voltage across the motor.

12. A controller for controlling a brushless direct current (BLDC) motor comprising:

a drive element in electrical communication with a power supply and the BLDC motor, wherein said drive element receives a controllably alterable voltage output provided by the power supply, wherein said drive element is capable of providing a pulse-width-modulated input voltage to the BLDC motor, and wherein said drive element is capable of measuring an average input current to the BLDC motor and a speed of the BLDC motor; and a processing element in electrical communication with the power supply and the BLDC motor, wherein said processing element is capable of altering the voltage output from the power supply based upon the average input current to the BLDC motor and the speed of the BLDC motor as measured by said drive element.

13. A controller according to claim 12, wherein said processing element alters the voltage output of the power supply such that a voltage applied to the BLDC motor equals an overhead voltage plus an offset voltage, wherein the overhead voltage depends upon at least one characteristic of the BLDC motor, and wherein the offset voltage depends upon the average input current to the BLDC motor and the speed of the BLDC motor.

14. A controller according to claim 13, wherein the at least one characteristic of the BLDC motor comprises at least one of a predetermined speed of the BLDC motor and a predetermined torque of the BLDC motor.

15. A controller according to claim 13, wherein the overhead voltage plus the offset voltage is not more than 40 volts above a terminal voltage across the motor.

16. A controller according to claim 12 further comprising an acoustic coating disposed about an outer surface of said controller.

* * * * *